Feb. 21, 1933.  I. SIKORSKY  1,898,644
AERIAL VEHICLE
Filed Jan. 19, 1929  8 Sheets-Sheet 1

INVENTOR
BY
ATTORNEY

Feb. 21, 1933.　　　I. SIKORSKY　　　1,898,644
AERIAL VEHICLE
Filed Jan. 19, 1929　　　8 Sheets-Sheet 2

Feb. 21, 1933.  I. SIKORSKY  1,898,644
AERIAL VEHICLE
Filed Jan. 19, 1929  8 Sheets-Sheet 3

Feb. 21, 1933.   I. SIKORSKY   1,898,644
AERIAL VEHICLE
Filed Jan. 19, 1929   8 Sheets-Sheet 7

Patented Feb. 21, 1933

1,898,644

UNITED STATES PATENT OFFICE

IGOR SIKORSKY, OF COLLEGE POINT, NEW YORK, ASSIGNOR TO SIKORSKY AVIATION CORPORATION, OF WILMINGTON, DELAWARE, A CORPORATION OF DELAWARE

AERIAL VEHICLE

Application filed January 19, 1929. Serial No. 333,603.

The present invention relates broadly to aircraft and, more particularly, to the position, form, arrangement and details of pilot's compartments in aerial vehicles. It also concerns a so-called universal pilot's compartment for an aerial vehicle, its position with relation to other parts of the structure of said vehicle, as well as the form, arrangement, relative positions, inter-relation and details of fixed, movable, and adjustable fixtures contained in, or forming a part of said pilot's compartment; the relation of said fixtures to each other and their relation to other structural elements of said aerial vehicle.

The invention further pertains especially to various combinations of any or all of said above improvements, their application to, or their use on, in, or in connection with individual heavier-than-air aircraft units of the multimotor, land-water-air type, capable of navigating with equal facility on land, water or in the air.

Where the term "aircraft" is used in the present application it includes any form of aerial vehicle capable of navigating through the air.

The term, "heavier-than-air aircraft unit of the multimotor, land-water-air type" designates a form of aircraft sometimes known as a "multimotor amphibian."

The purpose and objects of my invention will become clearly evident as the following description progresses, and from the accompanying drawings, forming part of my disclosure, but by no means is it intended to limit me to the structures shown beyond the broad sense of the invention as laid down and covered by the appended claims.

Referring to the drawings.

Figure 10 illustrates a similar view to that of Figure 9, showing the pilot and the pilot's seat in its lowered position.

Figure 20b is a side view of the mechanism shown in Figure 20a, Figure 20c is an end view of the mechanism shown in Figures 20a and 20b.

Referring to the figures, numeral 10 denotes the body of my aerial vehicle, which is preferably of a boat structure, to which are fastened wings or supporting surfaces 11 and 12, the former provided with ailerons 13.

At the rear of the vehicle there will be observed vertical rudders 13' and stabilizers 13", adapted to be controlled from within the pilot's compartment, as will be explained presently.

Figure 1:
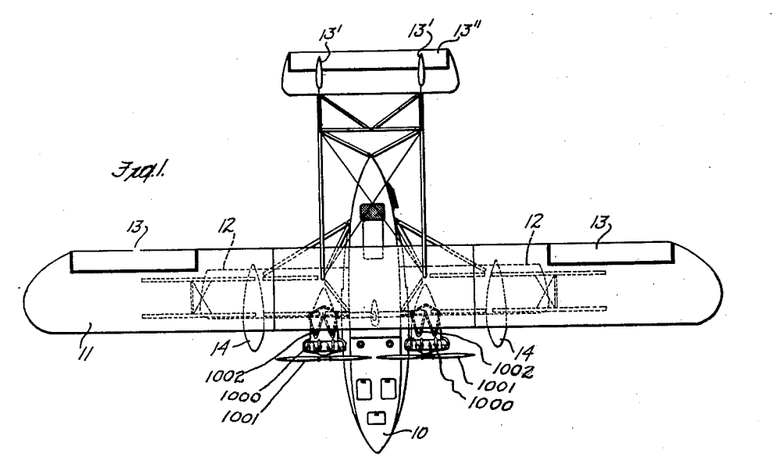
Figure 1 is a top view of my aerial vehicle.
Figure 2:
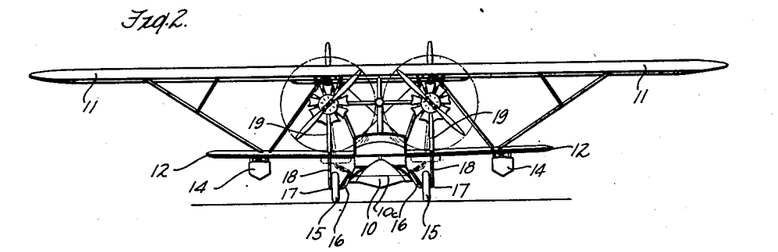
Figure 2 is a front elevation thereof.
Figure 3:
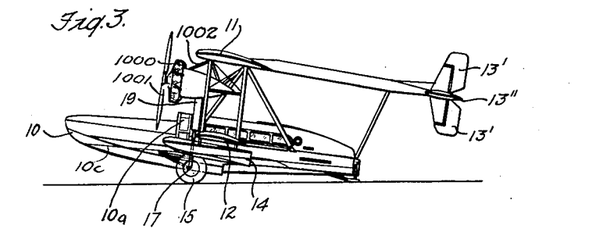
Figure 3 is a side elevation of the aerial vehicle
Figure 4:
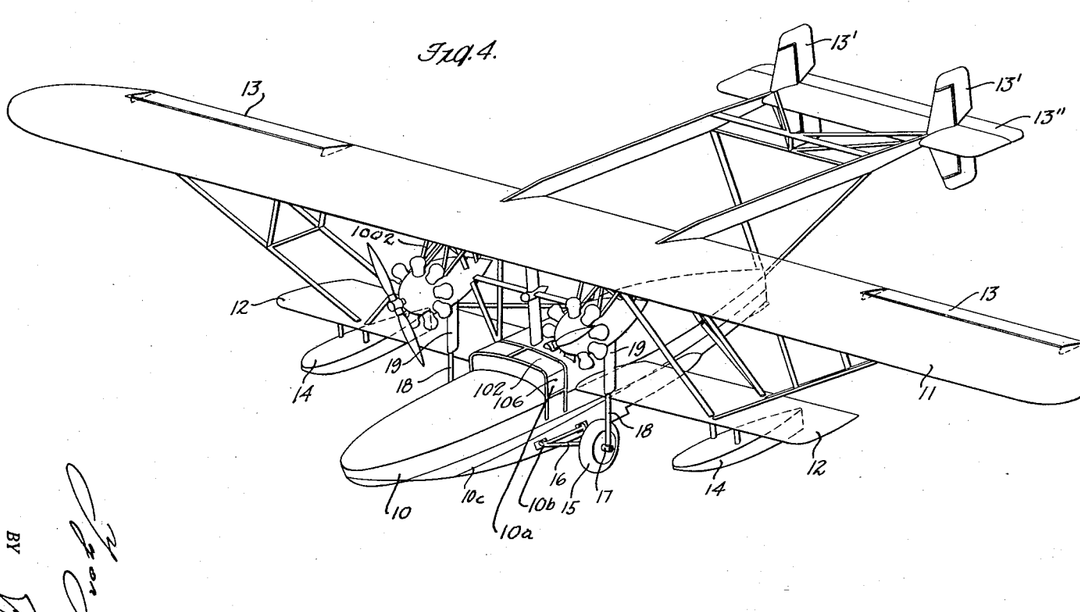
Figure 4 is an isometric diagrammatical illustration of my aerial vehicle.

Attached to the lower wing surfaces are balancing pontoons 14, and extending downward from the supporting structure, and in front of the supporting surfaces or wings will be seen a retractable landing gear 15, shown in Figure 2 in full lines in their operative position and in broken lines in their retracted position.

Figure 5:
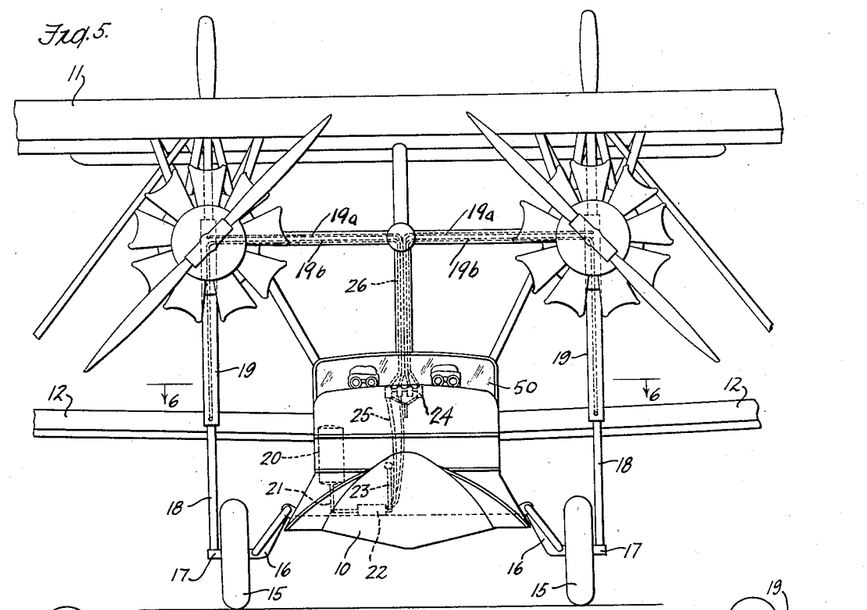
Figure 5 is a detail front elevation of the central portion of my vehicle.
Figure 6:
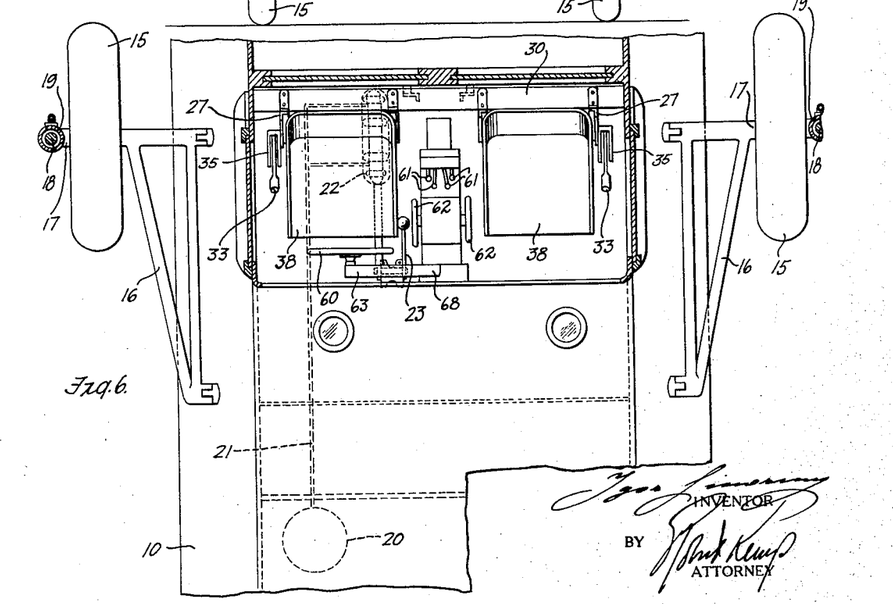
Figure 6 is an enlarged plan view of that portion, partially in section, taken on lines 6—6 of Figure 5 and exposing the pilots' seats and their arrangement.
Figure 7:
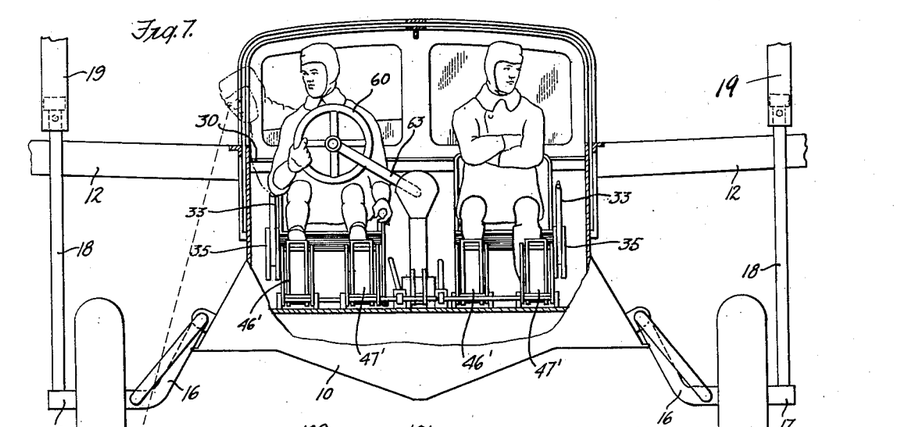
Figure 7 is an enlarged vertical cross sectional view through the pilot's compartment and showing the landing gears in operative position, and the two pilots in their elevated seats.
Figures 7A, 8:
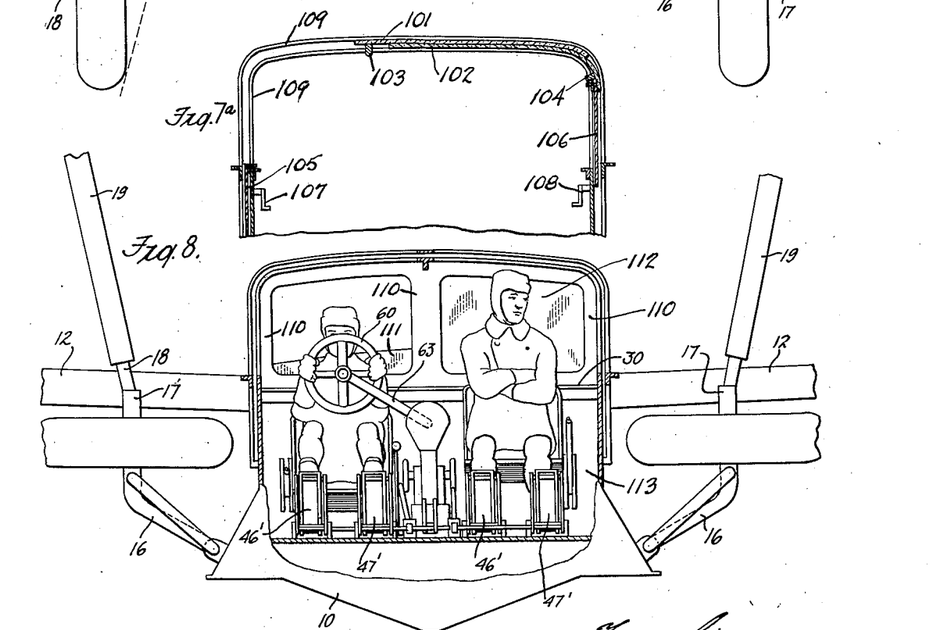
Figure 7a is a view showing the detailed construction of windows and window casings inside pilot's compartment.
Figure 8 is a similar vertical cross sectional view through the pilot's compartment, showing my vehicle in flight above water, and having the landing gears in their raised position, and one of the pilots in his elevated seat, while the other pilot is seen in his lowered seat.
Figure 9:
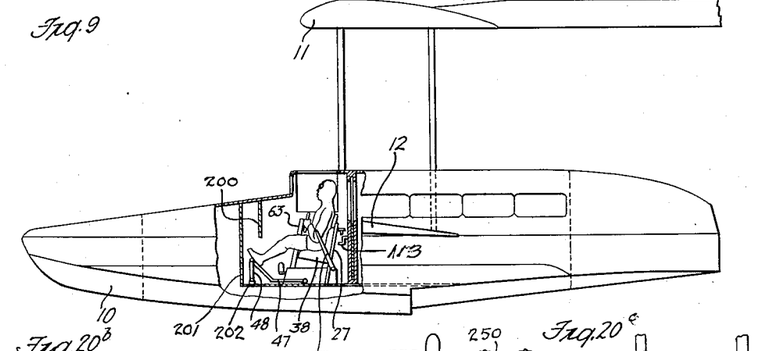
Figure 9 illustrates a diagrammatical side elevation of the body of my vehicle and showing the pilot's cabin, partially in section, and its relative position to the other parts of the structure of my vehicle, and the pilot, and his seat in elevated position.
Figures 10, 20B, 20C:
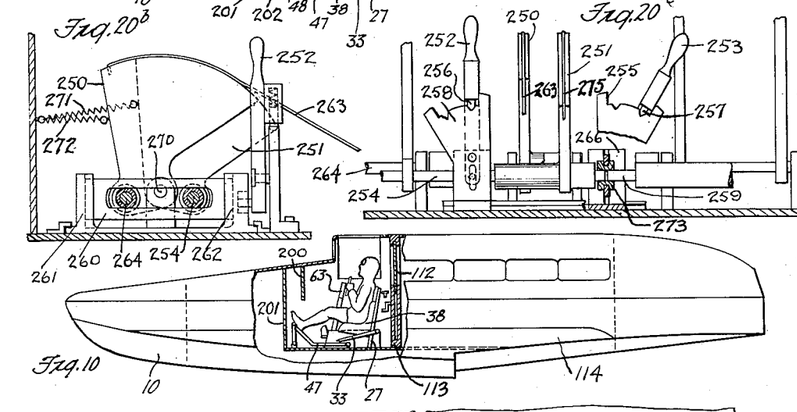

Their operative position may be also observed in Figures 4, 5, 6 and 7, while they are plainly seen in their retracted position in Figure 8.

This retractable landing gear is supported by hinged frame 16, attached at both sides to body 10. The outer extensions 17 of the axles of the landing gear are hingedly connected with supporting rods 18, at their upper end of which are provided plungers, adapted to operate within hollow members 19, which are hingedly connected with the framework of the vehicle.

By means of a hydraulic or a pneumatic arrangement, indicated in Figures 5 and 6 in broken lines, as will be described presently, the landing gear is caused to either descend preferably by means of liquid forced through pipes indicated by dotted lines 19 and 19a into operative position or ascent preferably by means of liquid forced through pipes 19b into operative position, as desired by the pilot within the pilot's compartment. It will be evident from the structure shown that rods 18 telescope with cylindrical member 19 when the landing gear is to be made inoperative. It will be also observed that while the landing gear is in its operative position, its construction forms what may be termed a shock absorber when the landing gear comes in contact with the ground.

Referring to Figures 5 and 6 the actuating mechanism for the landing gear will be clearly apparent. In these figures, numeral 20 denotes a container of glycerine or oil, from which leads a conduit 21 into a pump arrangement, indicated at 22, and controlled by a lever 23.

A distributing board, indicated at 24 in Figure 5, is connected by means of a plurality of conduits 25 and 26 to the left hand and right hand portions of the landing gear. By means of this distributing board, the pilot may, at will, put pressure either from the top or the bottom against the piston operating within member 19, thereby lowering or raising the landing gear as required.

It is obvious that the pilot should be in position to observe the operation of the landing gear as actuated by him from within his compartment. For this reason I have provided side windows, as seen clearly in Figures 7 and 8, 9 and 10, which may be either open or drawn shut at the desire of the pilot.

In order to place the pilots within easy access to the windows over their heads and at their sides and backs, the window arrangement shown in Figure 7a has been devised. The side windows slide in casement 109, these consisting briefly of two windows 105 and 106 actuated by cranks 107 and 108 and a pair of flexible windows shown at 101 and 102 respectively preferably provided with lifting handles 103 and 104 attached thereto.

By means of these flexible windows a pilot may, should he so desire and especially in case the windows are frosted by moisture, slide these flexible windows open, not only to obtain a better view of his landing gear mechanism on either side below him, but also secure a full and complete view of his motors and fuel systems, the motors being located, in the present type of aircraft, preferably above the landing gear 19 on each side of the pilot's compartment. If there are two pilots operating, it will be also observed that the same opportunity of opening the flexible windows is afforded either pilot, since these flexible windows can be made to slide across the casement on either side of the pilot's compartment.

Another window casement is provided back of the pilot's seats, which with its windows shown at 111 and 112 separates the pilot's compartment from the passenger cabin of the body boat. This casement designated by the numeral 110 guide and retain said rear windows, the windows in turn being actuated by levers or cranks 113, which are shown more specifically in Figure 9.

Referring to Figures 3, 4, 9 and 10, it will be evident that the pilot's compartment is located in front of the wings and in such position as to enable the pilot to make unrestricted observations not only in the direction of flight but also to both sides of the vehicle.

An important feature of my invention deals with the internal construction of the pilot's compartment and particularly with the seating and foot arrangements for the pilot or pilots, as the case may be. Bearing in mind the fact that the pilot is subjected to unusual strain, both in respect to nervous tension and unnatural and restrained bodily position within the compartment and furthermore, considering the fact that it is essential to provide accommodation for pilots of varying stature and body proportions, I have incorporated several important innovations within the pilot's compartment.

One of the improvements comprise one or more adjustable seats provided in the compartment, as will be clearly seen in Figures 7 to 15 and Figures 17 and 20. The arrangement of the seats relative to the compartment will be clearly observed from Figures 9 and 10.

Figure 11:
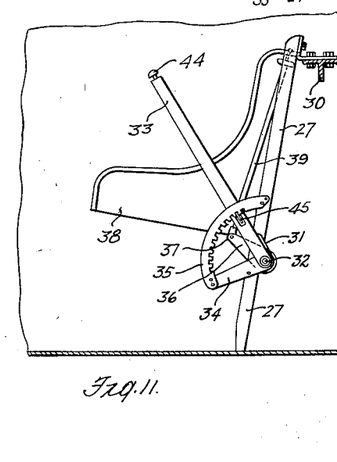
Figure 11 illustrates a detail view, in side elevation, of the pilot's seat in its raised position.
Figure 12:
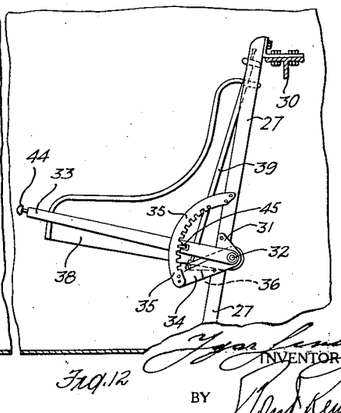
Figure 12 illustrates a similar view of the pilot's seat in its lowered position.
Figures 13, 14:
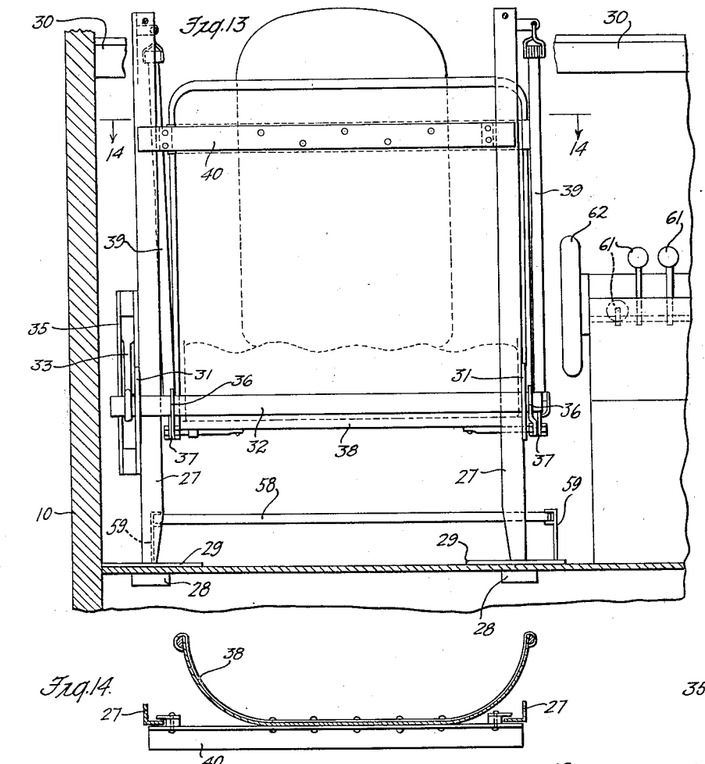
Figure 13 illustrates a cross sectional view, taken on line 13—13 of Figure 17 and an elevation of the left hand pilot seat.
Figure 14 represents a cross sectional view, taken on line 14—14 of Figure 13.
Figure 15:
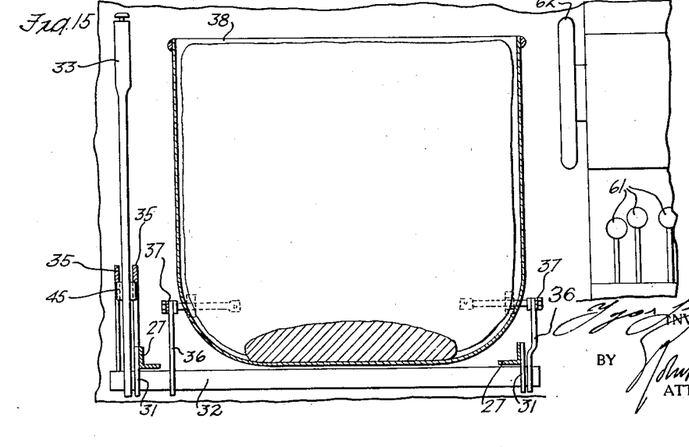
Figure 15 is a plan view, partially in section, taken on line 15—15 of Figure 17, of the pilot seat.
Figure 16:
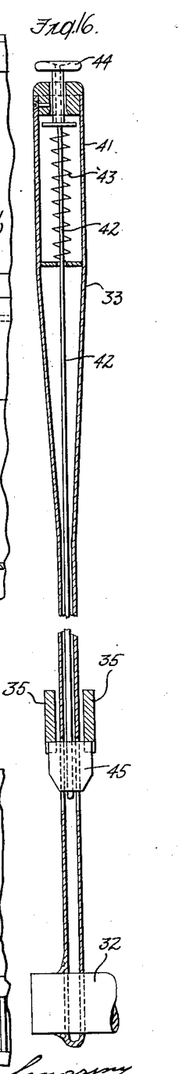
Figure 16 is a detail cross sectional view through the operating handle of the pilot seat.
Figures 17, 18, 19:
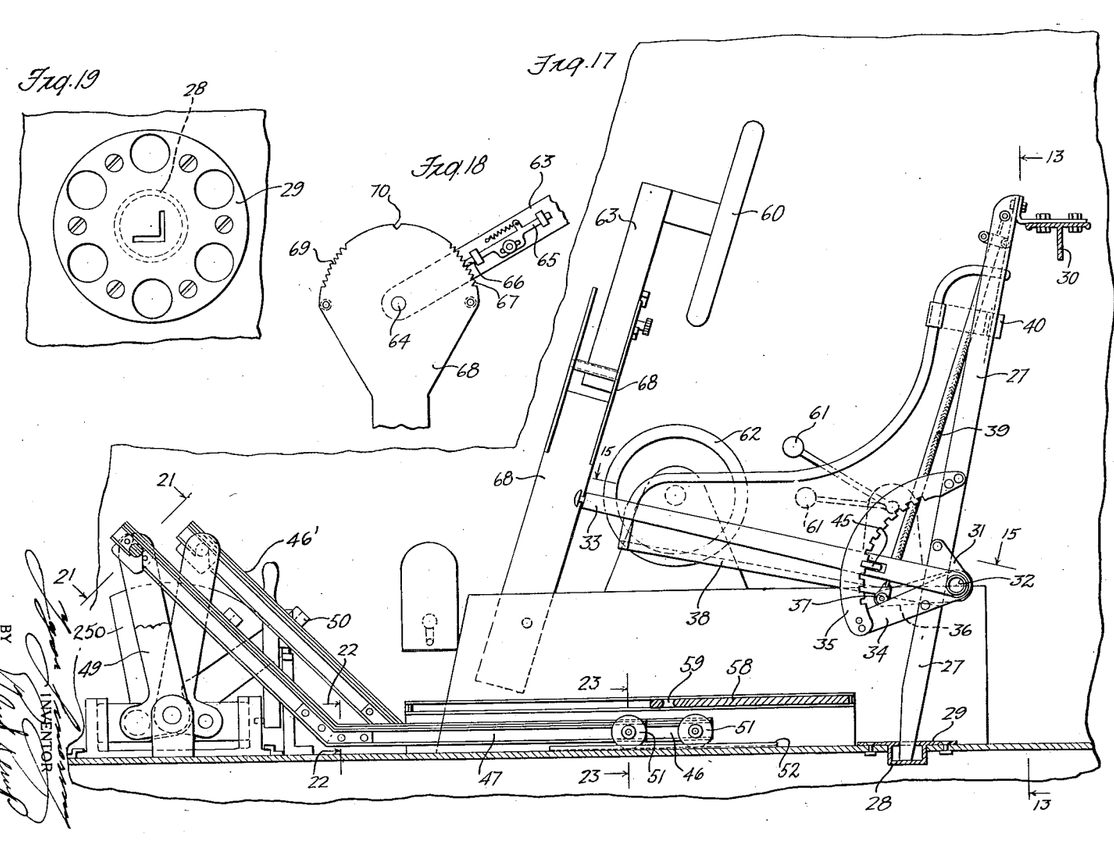
Figure 17 is a side elevation, partially in section, of a portion of the pilot's compartment, disclosing the adjustable pilot seat, foot pedals and other arrangement relative to the former.
Figure 18 is a detail elevation of the positioning means for the aileron control wheel in front of the pilot's seat.
Figure 19 is a detail plan view of a weight-distributing member, supporting the legs of the pilot's seat.

In Figures 11, 12 and 17, the arrangement shown comprises rear structural chair supports or a frame 27, resting in sockets 28 of the weight-distributing members 29, shown in detail in Figure 19, which members are permanently attached to the flooring of the compartment. The upper ends of rear supports 27 are permanently associated with the structural member 30, traversing the compartment, as clearly seen in Figures 7 and 8. At the lower portion of supporting members or frame 27 there is provided an extension plate 31 in which is rotatably lodged, at 32, an operating hand lever 33, shown in detail in Figure 16.

Extending downward from extension plate 31 there is a bracket 34 which supports the lower end of an internally toothed segment 35, attached at its upper end to supporting member 27. Hinged at 32 is a connecting lever 36, which is pivotally associated at 37 with the lower rear corner of seat 38. At that point resilient member 39 engages the seat also and extends upwards and is attached to the upper end of supporting member 27. This resilient member serves for facilitating the elevation of the seat when handle 33 is operated while the pilot is seated. The seat itself is guided relative to supporting members 27 by means of the structure, indicated at 40 (see Fig. 13).

The arrangement of lever 33 is seen in detail in Figure 16 and comprises a hollow handle portion 41, through which passes a rod 42, which is propelled outwards by spring 43 and terminates in a button 44 at its upper end. Rod 42 extends through the hollow portion of the lever and at its lower end there is seen attached a detent 45, which is adapted to engage the internal teeth of segment 35. By releasing detent 45, lever 33 may be swung either upwards or downwards, as shown respectively in Figures 11 and 12, and when button 44 is released, the position of lever 33 is fixed. By so doing, the seat may be either elevated or lowered while the pilot is seated thereon. The elevating of the seat is facilitated by elastic members 39, while the lowering of the seat is facilitated by the weight of the pilot himself.

The purpose of adjusting the position of the seat will become readily evident when it is considered that the pilot may desire, after a long period of flight, to change his position to either make observations through the windows or navigate by means of his instruments. In either case such observations should be restricted to the one desire and shall not be disturbed by the possibility of involuntarily distracting the attention of the pilot through the proximity or through the possibility of the other observation. In other words, when the pilot wishes to observe through the window, he shall not be disturbed by the nearness or the observation of the instruments, when on the other hand he wishes to navigate by the instruments alone, he shall not be disturbed by observation through the window. The positioning of the seat to its higher or lower position enables the pilot to concentrate upon his wanted task. Furthermore, the advantage of raising or lowering the seat facilitates the relaxation and change of position of the body of the pilot, which becomes particularly welcome during long flight periods.

Where more than one pilot is engaged in the operation of the aerial vehicle, the advantage of adjusting the seats becomes still more evident in that one pilot may navigate by instruments only while the other pilot, by raising his seat, may make observations directly through the windows.

In the above description of the adjustable seat, a specific structure is shown and explained. Needless to say that I shall not be restricted to the mechanical arrangement indicated, and that similar results may be readily obtained by pneumatic, hydraulic or other mechanical provisions enabling the pilot to either raise or lower the seat and himself.

Another important improvement in the arrangement within the pilot's compartment is the provision of pedals and foot rests, and the operation by the former of the vertical rudders. One of the uppermost advantages resulting from this arrangement plainly visible in Figures 7, 8, 9, 10 and particularly in Figure 17, is the fact that although the pilot may relax in his position, he is enabled to constantly have under his control, by his feet, the vertical rudder adjustment.

Referring to the above mentioned figures and also to Figures 20, 21, 22 and 23, there will be seen provided below the seat a right foot pedal member 46 and a left foot pedal member 47, extending angularly upwards, as indicated at 46' and 47'. The angular extensions engage, respectively, levers 48 and 49, controlling the vertical rudders of the plane. Each of the inclined portions 46' and 47' are provided with heel rests 50. The horizontal portions of the pedals are supported at their rear end by means of rollers or wheels 51, operating on runners 52, as will be clearly seen in Figure 23. At the central portion of the horizontal part of the pedals, there is provided an I beam 53, guided in a channel formed by two Z bars, indicated at 54. This arrangement prevents the sliding pedals from leaving the floor structure of the compartment.

Figures 20, 20A, 21, 22, 23:
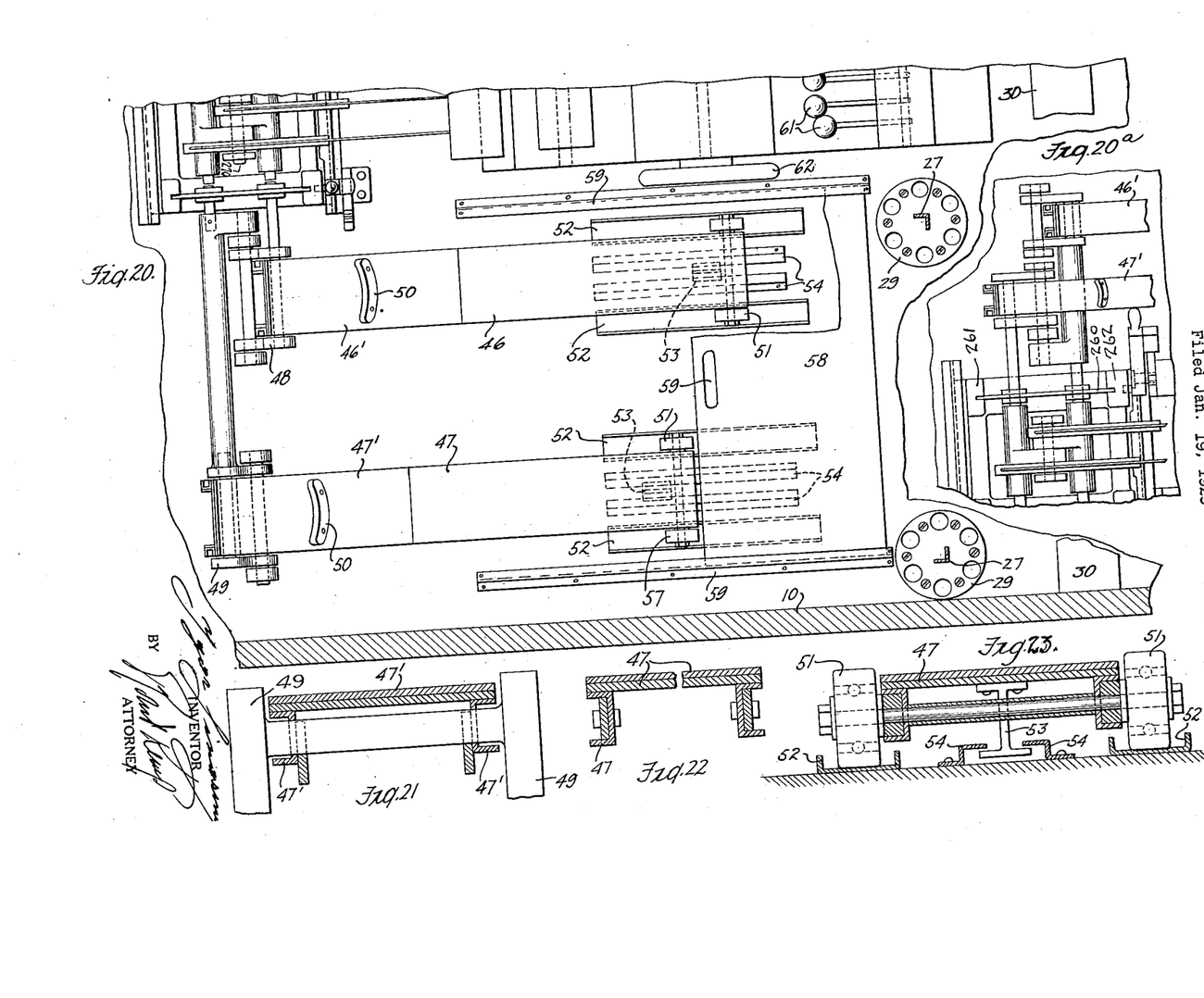
Figure 20 illustrates a horizontal cross sectional view through a portion of the pilot's compartment, showing the left hand pilot seat removed and disclosing a plan view of the foot pedals and their arrangement below the seat.
Figure 20a is a plan view in detail showing the mechanism for connecting and disconnecting the two sets of pilot's pedals shown in Figure 20.
Figure 21 is a cross sectional detail view, taken on line 21—21 of Figure 17.
Figure 22 is a cross sectional detail view, taken on line 22—22 of Figure 17, showing the detail construction of a pedal member.
Figure 23 is an enlarged cross sectional view, taken on line 23—23 of Figure 17, illustrating the support of the pedal member and the manner of its mounting, relative to the floor of the pilot's compartment.

Pivoted levers 48 and 49 operate, respectively, shafts 55 and 56, as seen in Figure 20. In the event one of the pilots wishes to relax, coupling or clutch devices, indicated at 57 in Figures 7 and 8, operable by either of the pilots, may be used for disconnecting one or the other side of the rudder control mechanism.

Normally, while the pilot operates the plane, he will rest his feet above heel rests 50. However, he may relax the position of his legs by shifting the feet downwards on the inclined portions 46 and 47, but he may rest his feet on the horizontal portions of the pedals and nevertheless be able to control the vertical rudder mechanism.

In the event that the pilot wishes to relieve himself completely of the foot control and rests his legs in any desired position, he may avail himself of a slidable foot rest, seen in Figures 17 and 20, and indicated at 58. This foot rest consists of a slidable platform, guided in channels 59, extending above pedals 46 and 47. Foot rest 59 is normally positioned directly below seat 38 and may be pulled forwards by means of hand slot 59.

It is also possible, in accordance with the present invention, for a pilot sitting in one of the pilot's seats to disengage the pedal control mechanism operating the vertical rudders on one side of the pilot's compartment from the pedal control mechanism on the other side of the pilot's compartment. In other words I have made it possible for two pilots to operate the controls together or separately as they may desire by the pedal interlocking device illustrated in Figures 20, 20a, 20b and 20c.

Referring to these figures, I have shown mounted on the floor of the pilot's compartment, a metal base carrying posts 261 and 262 in which a sliding member 260 is vertically positioned in slidable relation to said posts, said sliding member carrying a horizontal slot, or guide space, in which shafts 254 and 264 move up and down.

Control wire 263 which controls the vertical steering rudders of my amphibian are attached to the surface of sector shaped elements 250 and 251 held normally in forward position by springs. These sectors rock on a pin 270 pivotally mounted as shown and they are able by the upward and downward movement of bar 260 to oscillate forward and backward about pin 270. The movement of the bar 260 downward for example moves sector 250 forward, simultaneously moving sector 251 backward. By means of levers 252 and 253 pins 254 and 259 may engage or disengage respectively one side or the other of the pedal control mechanism thus controlling the movement of sectors 250 and 251. It will be noted that each of the levers is provided with a locking mechanism indicated by numerals 256 and 257 working in notched sectors 258 and 255 respectively so that it is possible by the movement of either or both of the levers to entirely engage or disengage one set of pedals or both sets of pedals from the two sectors carrying on their curved upper surfaces vertical rudder control wires which have been fastened thereto.

Referring to Figure 6, it will be observed that all hand controls for the plane are in two sets, except the aileron control, indicated at 60. Thus, the engine control levers 61 are arranged symmetrically to the center axis between the seats and also the stabilizer controls 62 are similarly arranged. The aileron control 60 may be swung in front of either pilot and may be set to its desired position by the arrangement shown in elevation in Figure 18. In this figure, the wheel support 63 is seen to be pivoted at 64 and provided with a spring actuated detent arrangement 65, adapted to engage with its detent 66, one of the teeth 67 of the right hand segmental portion of member 68. A similar segmental portion 69 is shown on the left hand side of this member, while at the center is provided a recess 70 for setting the aileron control into neutral position between the two pilots.

In the matter of the distribution of its component parts, it will be noted that in general my heavier-than-air multimotor land-water-air type of aircraft is substantially symmetrical about an imaginary vertical plane drawn through the center line of my amphibian. I have found that a fairly equal distribution of structure and weight contributing elements such as power plants promotes lateral stability when the amphibian is navigating either on land, water or in the air.

My invention may be further characterized as a "multimotor amphibian," possessing the feature in its design of a plurality of motors. These motors are preferably distributed symmetrically on each side of the longitudinal center line of the amphibian and in the present instance are shown in the drawings as two internal combustion engines designated by the numerals 1000 and 1000. In each instance the engines or power plants drive tractor propellers shown as 1001 and 1001 connected to supporting surface or wing 11 by connecting members 1002. The two tractor propellers one on each side of the body 10, containing the pilot's compartment 10a, operate preferably as shown in front of the wing in a manner to pull the amphibian forward through the air, or in the water or on the land.

The motors are positioned also adjacent to the wings in a manner to transmit their load or their weight to the body structure and also via the body structure to the retractable landing gear which is hingeably mounted as shown at 10b on the body boat adjacent the pilot's compartment 10a. In this way it will be seen that the tractor propellers revolve within full view of the pilot in the pilot's compartment. It will be noted further that the motors are attached to the wing or supporting surface the wing being located above and across the body of my multimotor amphibian.

When as in my present multimotor amphibian the pilot's compartment is in part or in whole forward of the wing or wings, and when as in my design, retractable landing gear controlled by controlling devices within said pilot's compartment is hingeably mounted on a body boat structure, especially in such a manner as to permit the pilot by looking out and down from his windows to observe the exact relation or position of his landing gear mechanism with reference to his body boat, and when at the same time he is thus also able to observe accurately the condition of his propellers, such as their speed of rotation, etc., it will be clear to the casual observer that a marked degree of safety has been inherently built into the structure of my multimotor amphibian especially when the pilot is not only able inside of the pilot's compartment to control the movement of the retractable landing gear to various points above or below the water line 10c on his body boat structure, but when he is also able through adjacent engine controls, aileron control, rudder controls, stabilizer adjusting mechanism, instrument board, etc. to control substantially all of factors which of necessity must be under control when a pilot is navigating with more than one motor on the land, water or in the air.

The foregoing description of the several devices and their arrangement within the vehicle body and their relations to the different structural parts of the aerial vehicle, clearly set forth their objects, purposes, advantages and structural designs, which, when summarized, complete a universal pilot's compartment for aerial vehicles, in which individual pilots of varying stature and body proportions may operate, separately or together and with utmost safety, comfort, ease and without undue nervous or muscular strain, and thus navigate over long flight periods.

It is evident that the innovations incorporated in the pilot's compartment are designed to facilitate not only complete relaxation of the pilots and enable their recuperation from their nervous and muscular exertions, but afford thereby to the passengers entrusted to the pilots' care, a greater degree of safety and security.

The foregoing improvements furthermore facilitate navigation of aerial vehicles by permitting the pilot or pilots to devote their full attention to either outside observation, or to navigation by instruments only. Still other advantages and safety features reside in the fact that although the pilot or pilots may completely relax in the seats, they remain in full and immediate control of the machine in the event of emergency.

While I have shown and described specific forms of the different arrangements comprising the innovations about and within the pilot's compartment, and the landing gear, I shall not be restricted thereby in any way, and I therefore reserve for myself the right, to make such changes in construction and operation of these devices, and such improvements thereon, as may become necessary or advantageous when applied to various aerial vehicles.

I claim:—

1. In a land-water-air vehicle, the combination comprising a vehicle body, retractable landing gear attached to said vehicle body, a pilot's compartment formed by parts of said body, a window in said pilot's compartment, a sliding seat within said pilot's compartment adjacent said window, hand controls, foot controls and control means for extending and retracting said landing gear adjacent said sliding seat, connecting means for raising and lowering said landing gear, said connecting means connecting said landing gear control means and said retractable landing gear and seat adjusting means whereby said pilot may adjust the height of said seat and the distance of said seat from said window in said pilot's compartment.

2. In a land-water-air vehicle, the combination comprising a vehicle body boat, a supporting surface or wing connected to said vehicle body boat, a retractable landing gear hinged to said body and connected by telescopic means to said supporting surface, a pilot's compartment in said body boat, windows in the walls of said pilot's compartment, a seat in said pilot's compartment adjustable in relation to said windows for affording said pilots a variable view of said retractable landing gear, fluid pressure means for actuating said telescopic means said fluid pressure means mounted in said pilot's compartment and conduit connecting said fluid pressure means and said telescopic means.

3. In a land-water-air vehicle, the combination of a body boat structure, retractable landing gear mounted on said body boat structure, a pilot's compartment forming a part of said body boat structure, a plurality of sliding seats within said pilot's compartment, windows in said pilot's compartment adjacent said seats, and means for adjusting said seats with relation to said windows to afford persons sitting in said seats better views of said retractable landing gear.

4. In a land-water-air vehicle, the combination of a body boat structure, retractable landing gear members mounted on each side of said body boat structure, a pilot's compartment forming a part of said body boat structure, a plurality of sliding seats within said pilot's compartment, hand control mechanism and foot control mechanism and windows positioned adjacent two of said sliding seats and means for sliding said seats with relation to said windows to afford persons occupying said seats better views of either of said retractable landing gear members.

Signed at College Point, Long Island, in the County of Queens and State of New York this 21st day of December A. D. 1928.

IGOR SIKORSKY.